United States Patent [19]
Kimoto et al.

[11] Patent Number: 5,381,476
[45] Date of Patent: Jan. 10, 1995

[54] VIDEO THEATER SYSTEM AND REPRODUCING APPARATUS THEREFOR

[75] Inventors: Takayuki Kimoto, Hirakata; Tatsuhiro Hosokawa, Ibaraki, both of Japan

[73] Assignee: Matsushita Electric Industrial Co., Ltd., Kadoma, Japan

[21] Appl. No.: 6,304

[22] Filed: Jan. 22, 1993

[30] Foreign Application Priority Data

Jan. 24, 1992 [JP] Japan .................. 4-010615

[51] Int. Cl.⁶ ................ H04N 7/167; H04N 5/76
[52] U.S. Cl. ......................... 380/5; 358/335; 360/33.1; 360/37.1; 360/60; 380/10
[58] Field of Search ............ 358/335, 310, 319, 148, 358/86; 360/33.1, 27, 15, 37.1, 60; 380/5, 10; 348/6, 500; H04N 5/76, 9/79, 7/167

[56] References Cited

U.S. PATENT DOCUMENTS

| | | | |
|---|---|---|---|
| 4,405,942 | 9/1983 | Block et al. | 358/119 |
| 4,819,098 | 4/1989 | Ryan | 358/335 |
| 4,945,563 | 7/1990 | Horton et al. | 380/10 |
| 5,130,810 | 7/1992 | Ryan | 358/335 |
| 5,157,510 | 10/1992 | Quan et al. | 358/310 |
| 5,177,485 | 1/1993 | Daniel et al. | 380/14 |
| 5,194,965 | 3/1993 | Quan et al. | 358/310 |
| 5,208,856 | 5/1993 | Leduc et al. | 380/14 |

FOREIGN PATENT DOCUMENTS

| | | |
|---|---|---|
| 519320 | 12/1992 | European Pat. Off. . |
| 2609589 | 7/1988 | France . |
| 2131000 | 6/1984 | United Kingdom . |

OTHER PUBLICATIONS

Heinz Griesshaber, "Managing Secure and Confidential Video Distribution"; 1991 IEEE WPM 5.6; pp. 74–75.

*Primary Examiner*—Tommy P. Chin
*Assistant Examiner*—Khoi Truong
*Attorney, Agent, or Firm*—Cushman Darby & Cushman

[57] ABSTRACT

A video theater system has a reproducing apparatus by which picture reproduced from a distribution tape and picture received from a communication satellite are alternatively put on the screen. A scrambled signal transmitted from the communication satellite is converted to a scrambled signal of the same form signal as the scrambled signal reproduced from the distribution tape, thus enabling a common decoder to descramble both the two signals coming from different input routes from each other.

7 Claims, 4 Drawing Sheets

VIDEO THEATER SYSTEM AND REPRODUCING APPARATUS THEREFOR

FIELD OF THE INVENTION AND RELATED ART STATEMENT

1. Field of the Invention

The present invention relates to a video theater system in which a distribution tape made by a tele-cine (photo-electric conversion) device for a movie film etc. is put on a screen.

2. Description of the Related Art

In Japan, there were approximately 7,500 movie theaters in the period from 1955 to 1984, and the film industry in those days occupied the leading part in the picture amusement industry of Japan. However, since then, the leader has changed from the movies to television. Further, in recent years the business of renting a of video cassette tape of a movie has become popular. As a result, the number of the movie theaters in Japan decreased to 1,912, in 1989.

On the other hand, in the United States, the movie business has grown through the improvement of movie theater equipments and the establishment of multiplex theaters. In those years, number of the movie theaters has increased from approximately twenty thousand to twenty-four thousand, and the income of the film industry increased as a whole.

To stop the aforementioned decline of the film industry, Japanese cinema companies have made several countermeasures such as technical improvements of movie theater equipment, preparation of luxurious seats and establishment of miniature theaters. However, with all such efforts, there has been little effect yet.

In the above-mentioned circumstances, there have appeared video theaters, which project image on the screen by utilizing a video cassette tape in place of a film, in various parts of the country. These video theaters are established in combination with a supermarket or a large store, etc., rather than as an independent movie theater. Each of these video theaters has approximately one hundred seats, and projection of the cinema is automatically operated.

Hereafter, the video theater system is described. FIG. 4 is a block diagram showing a making and reproducing system for a video tape which is to be distributed to the video theater. In FIG. 4, pictures on a film are converted into electric signals by a tele-cine device 2 including a photo-electric converter 2a and a color corrector 2b. The tele-cine device 2 applies photo-electric conversion to pictures on the film and makes color correction to improve color reproducibility. Electric signals issued from the tele-cine device 2 are recorded on a master tape 4 by a master VCR (Video Cassette Recorder) 3 such as a digital VCR. Next, the electric signals recorded on the master tape 4 are reproduced by another master VCR 5, and many distribution tapes 7 are made by a dubbing VCR 6. For instance, an M2-format VCR such as a type AU-650 by Matsushita Electric Industries is used as the dubbing VCR 6. These distribution tapes 7 are distributed to the video theaters to be put on the screen. In the video theater, several M2-format reproducing VCRs 8 are used to reproduce signals recorded on the distribution tapes 7. An AV controller 9 selects video signals which are to be reproduced by the reproducing VCRs 8. Video signals selected by the AV controller 9 are input to an ED (Enhanced Definition) / WD (Wide Display) digital scanning converter 10 to thereby get a progressive scanning for double density; and resultant video signals are projected by a projector 11.

However, there is a problem in the above-mentioned conventional system. That is, since management of the distribution tape 7 is entrusted to a manager of the video theater, it is easy to secretly make illegal dubbed copies from the distribution tape 7. This may result in interference with a rental video business. Protection against the illegal dubbing may be applied to some video tapes. But, many of these video tapes have only simple protection for the video-theater in horizontal synchronizing signals of video signals. Since the image signal itself exists in the tape as it is, it is easy to make a copy tape by taking off the protection.

Further, with the spread of the video theaters, many distribution tapes 7 are needed. Therefore, a distribution company has to manage many video tapes, and the screening cost in the theater at a remote place is high.

OBJECT AND SUMMARY OF THE INVENTION

An object of the present invention is to offer a system which can prevent rampancy of illegal dubbing of video theater tapes, etc., and to offer another screening system besides the distribution system necessitating the use of many video tapes.

In order to achieve the above-mentioned object, a video theater system of the present invention comprises:

reproducing means for reproducing a first scrambled signal recorded in a video tape;

receiving means for receiving a second scrambled signal transmitted from a communication satellite;

signal converting means for removing a copy-protection process from the second scrambled signal to thereby convert the second scrambled signal into a third scrambled signal which is the same form signal as the first scrambled signal;

selection means for selecting one of the first scrambled signal and the third scrambled signal;

descrambling means for descrambling a signal selected by the selection means into a picture signal; and display means for displaying a picture based on the picture signal.

According to the above-mentioned video theater system, the scrambled signal transmitted from the communication satellite is converted to the scrambled signal of the same form signal as the scrambled signal reproduced from the video tape. Therefore, both the two signals of different input routes from each other are descrambled by the common descrambling means. This system is also advantageous in lowering the screening cost at the remote place that the screening can be realized by the signal transmitted from the communication satellite besides the ordinary screening system dependent on the distribution tape only.

From another standpoint, the present invention offers a reproducing apparatus for the video theater, comprising:

a reproducing video cassette recorder for reproducing a signal recorded in a video tape in a form scrambled by a process of line permutation:

receiving means for receiving a signal transmitted from a communication satellite in a copy-protected form by at least two processes including the line permutation;

a first decoder for removing a copy-protection process other than the line permutation from a signal received by the receiving means;

multiplexing means which extracts a scramble key signal from an output signal of the first decoder and multiplexes a picture signal of the output signal by a signal made by adding a synchronization signal to the scramble key signal;

selection means for selecting one of signals issued from the reproducing video cassette recorder and the multiplexing means;

a second decoder for removing a scrambling process of the line permutation from a signal selected by the selection means; and display means for displaying a picture based on an output signal of the second decoder.

According to the above-mentioned reproducing apparatus for the video theater, both the two signals of different input routes from each other are descrambled by the common decoder, and very excellent concealment against the illegal recording is realized in a communication satellite transmission system by an intermediate process that the code processing is changed thereat.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, preferred embodiments of the present invention are described with reference to the accompanying drawings.

First Embodiment

Figure 1:
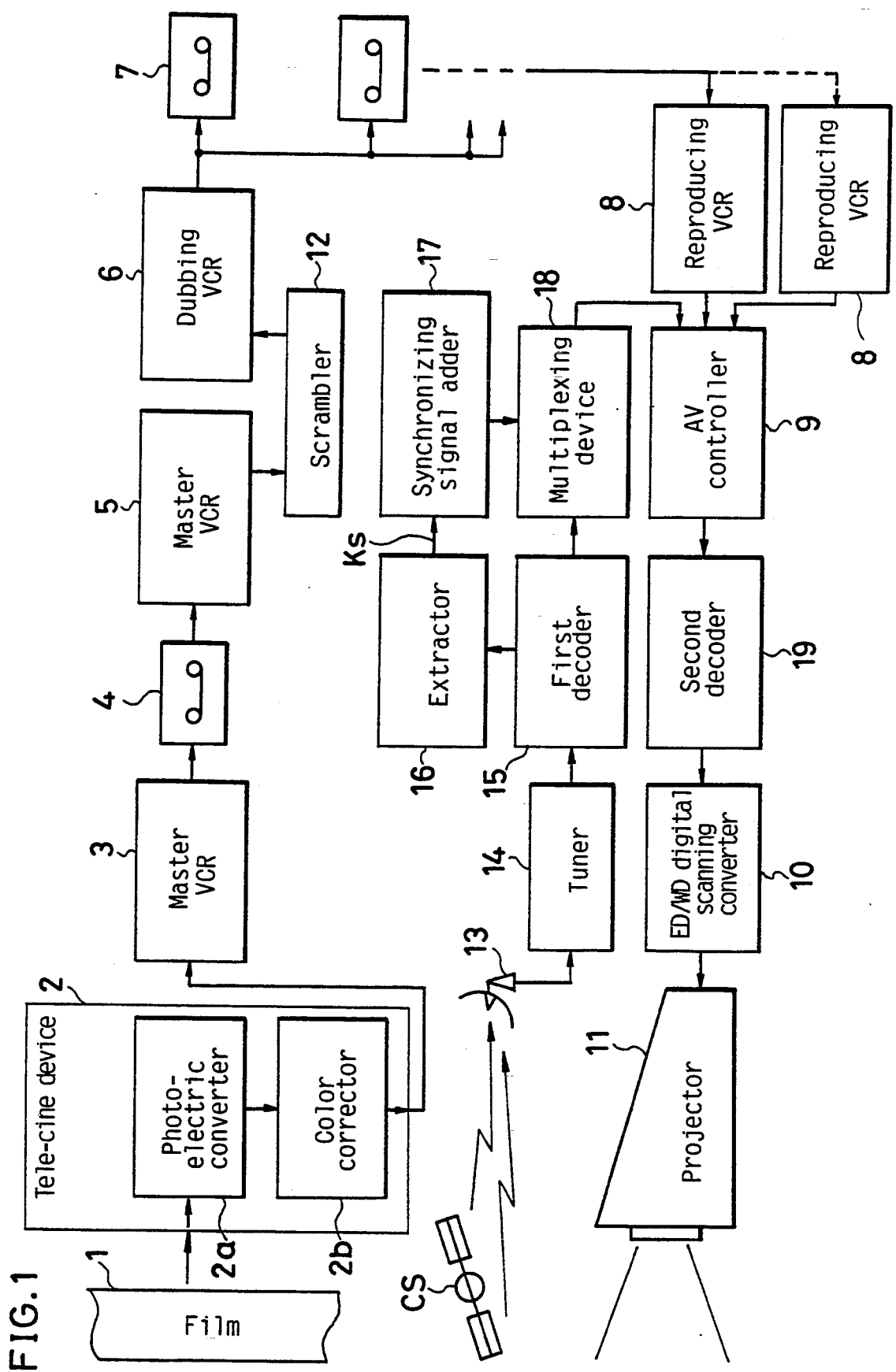
FIG. 1 is a block diagram showing a making process of a distribution tape from a film and a reproducing apparatus for a video theater in a first embodiment.

FIG. 1 is a block diagram showing a process of making distribution tape 7 from a film 1 and a reproducing apparatus for a video theater by which a picture reproduced from the distribution tape 7 and a picture received from a communication satellite via radio waves are alternatively put on a screen.

In FIG. 1, pictures on the film 1 are converted into electric signals by a tele-cine device 2 including a photo-electric converter 2a and a color corrector 2b. The tele-cine device 2 applies photo-electric conversion to pictures on the film 1 and makes color correction to improve color reproducibility. Electric signals issued from the tele-cine device 2 are recorded on a master tape 4 by a master VCR 3 such as a digital VCR. The electric signals recorded in the master tape 4 are reproduced by another master VCR 5. Next, signals reproduced by the master VCR 5 are scrambled by a scrambler 12. The scrambler 12 includes a circuit for multiplexing the signals by a scramble key signal $K_S$ (e.g., a 64 bit random number which also is used at the time of descrambling. In this embodiment, scrambling by line permutation is executed, and the multiplexing by the scramble key signal $K_S$ is executed during a vertical blanking period of video signals. Signals issued from the scrambler 12 are recorded in many distribution tapes 7 by a dubbing VCR 6.

On the other hand, a communication satellite CS also is transmitting scrambled signals. More specifically, scrambling by line permutation is executed, and copy-protection processes by synchronization-suppression-and-synchronization-level-shift and video inversion are executed.

Radio waves transmitted from the communication satellite CS are received by an antenna 13 and thereafter selected by a tuner 14. Signals selected by the tuner 14 are input to a first decoder 15, and thereat the copy-protection (processes) by the synchronization-suppression-and-synchronization-level-shift and the video inversion are decoded (removed). Decoded signals are input to a multiplexing device 18. At the same time, an extractor 16 reads the coded scramble key signal $K_S$ out of output signals of the first decoder 15. A synchronizing signal adder 17 adds a synchronizing signal of the video signal to the scramble key signal $K_S$, and the resultant signals are input to the multiplexing device 18. In the multiplexing device 18, the scramble key signal $K_S$ with the synchronizing signal added is used to multiplex the video signal scrambled by the line permutation within a vertical blanking period, and the resultant signals are input to an AV controller 9. Output signals issued from a reproducing VCR 8, which reproduces scrambled signals recorded on the distribution tape 7, are also input to the AV controller 9. The AV controller 9 selects and issues one of the scrambled signals coming from the communication satellite CS and the reproducing VCR 8. Output signals issued from the AV controller 9 are descrambled by a second decoder 19 to be restored into normal video signals. These video signals are input to an ED/WD digital scanning converter 10 and put on the screen by a projector 11.

As has been stated above, the signals transmitted from the communication satellite CS are converted to the scrambled signals of the same form as the signals recorded on the distribution tape 7. Therefore, both the two signals of different input routes from each other are descrambled by a common (second) decoder 19; and software supplied in the form of a radio wave transmission and software supplied by the distribution of video cassettes are selectably put on the screen. Further, concealments against the illegal dubbing and recording are applied to the distribution tape 7 and the signals transmitted from the communication satellite CS, respectively. Also, the screening cost at the remote place is lowered because the screening can be realized by the signals transmitted from the communication satellite CS besides the ordinary system dependent on the distribution tape 7 only.

Apart from the above-mentioned first embodiment in which the second decoder 19 is disposed outside of the projector 11, another embodiment may be such that the second decoder 19 is incorporated in the projector 11 or a display (not shown) equivalent to the projector 11.

Although it is probably most preferable in terms of the concealment to execute the descrambling within the casing of the projector 11 (as shown by a projector 21 in FIG. 2), there is no particular problem if the descrambling is executed in the ED/WD digital scanning converter 10 at a stage prior thereto.

Second Embodiment

Figure 2:
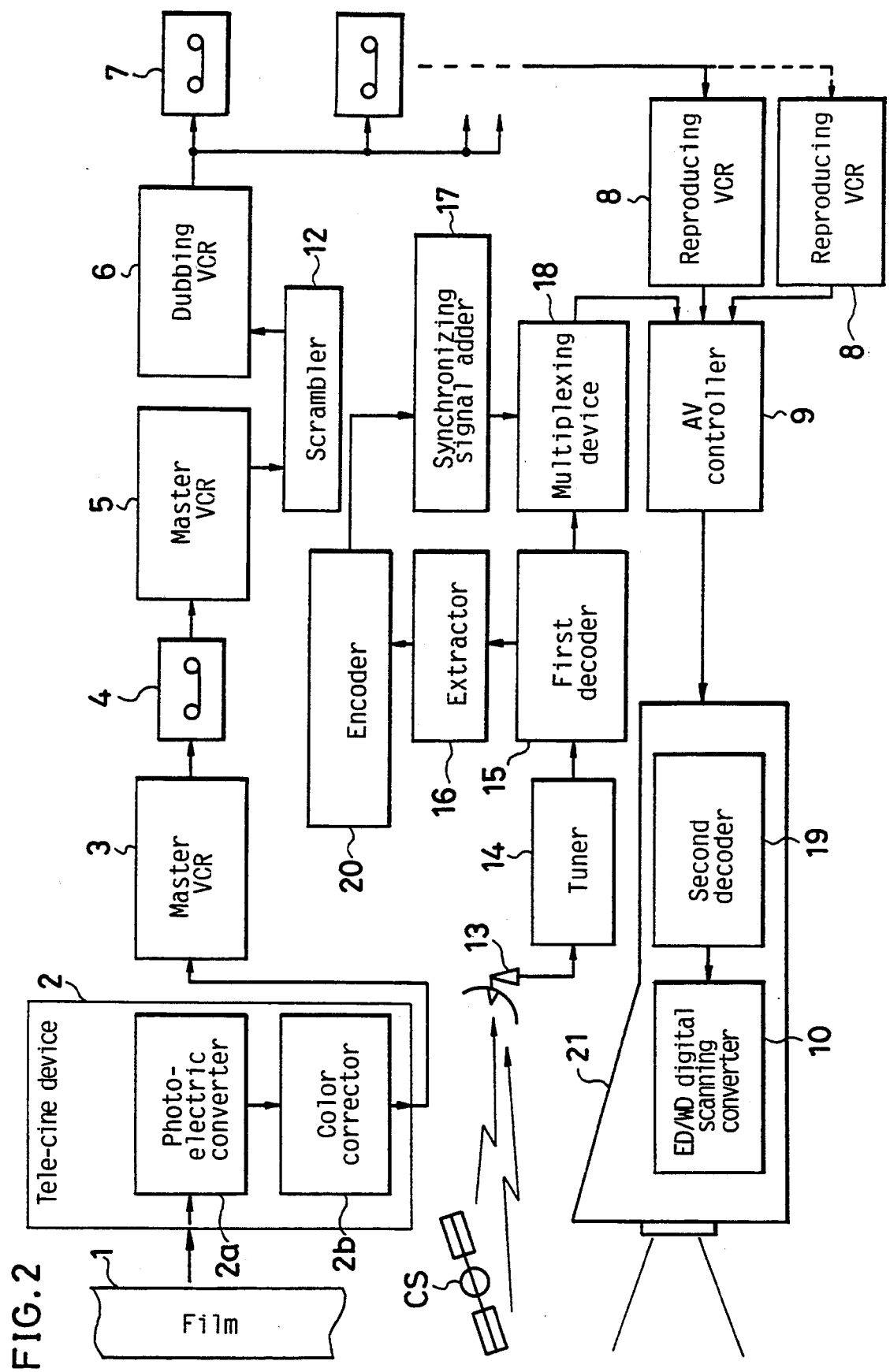
FIG. 2 is a block diagram showing a making process of a distribution tape from a film and a reproducing apparatus for a video theater in a second embodiment.

FIG. 2 is a block diagram showing the second embodiment of the present invention. Corresponding parts are labeled with numerals or marks which are the same as the first embodiment, and descriptions thereon made in the first embodiment are similarly applied. In this second embodiment, an encoder 20 is provided, and the projector 21 includes the ED/WD digital scanning converter 10 and the second decoder 19. A process of making the distribution tape 7 and a system for distribution to the video theater are substantially the same as the first embodiment.

Figure 3:
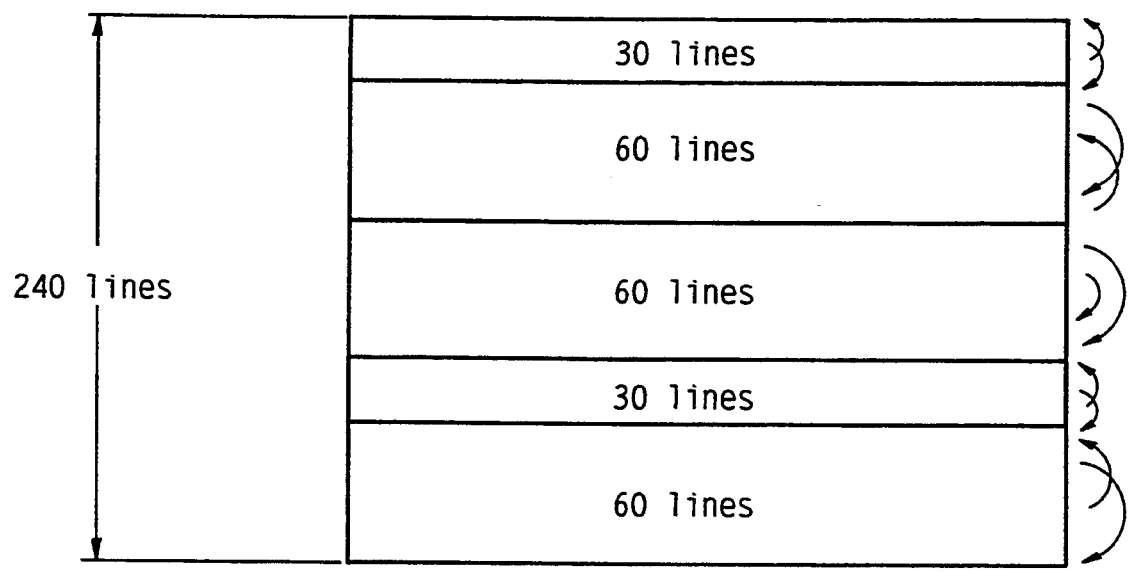
FIG. 3 is an illustration showing a method of the line permutation.
Figure 4:
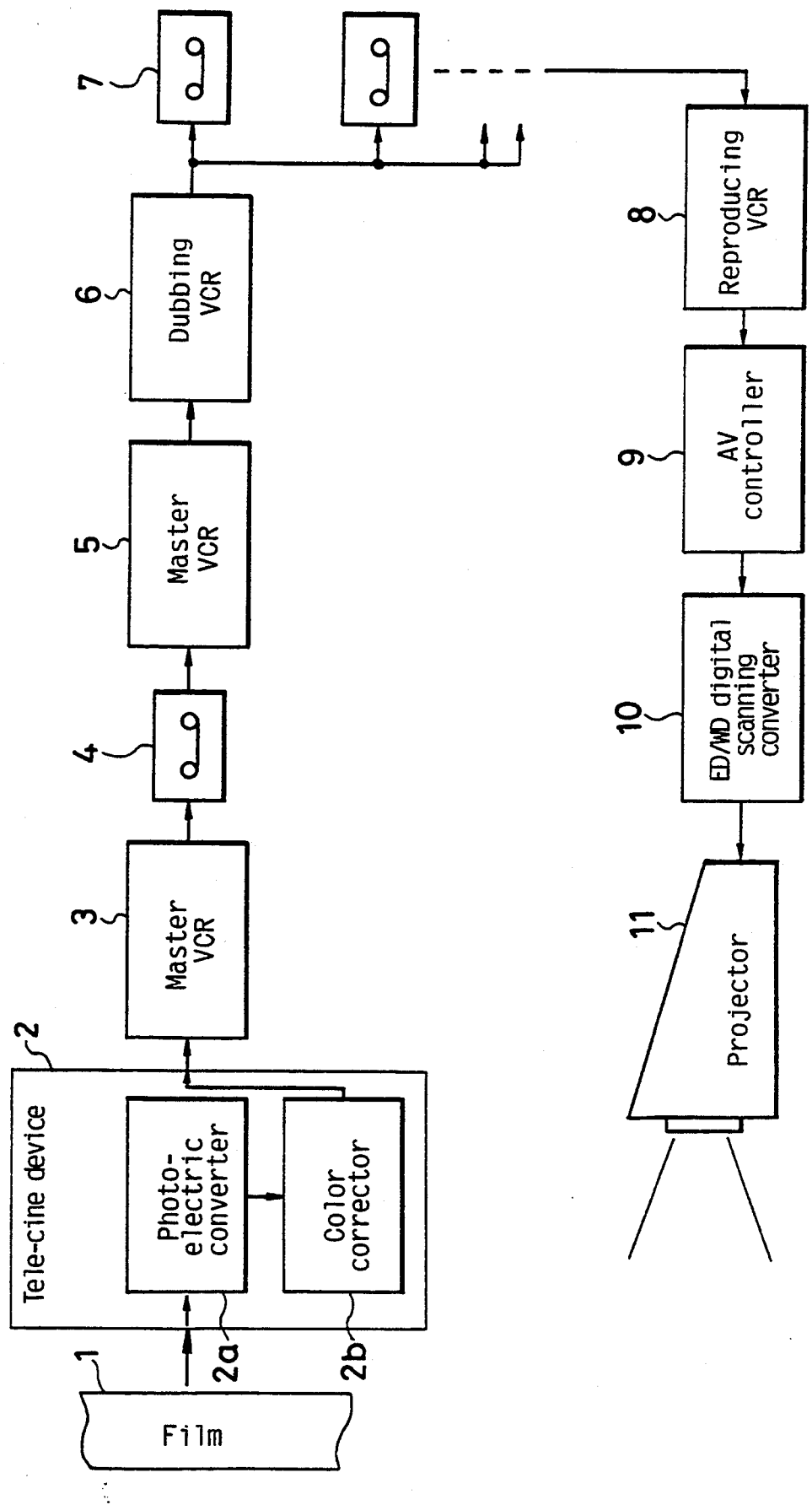
FIG. 4 is a block diagram showing the conventional making and reproducing system of a video tape.

Hereinafter, a scrambling method by line permutation, which is the same as the first embodiment, is described. Scrambling by the scrambler 12 is executed by a process of line permutation. Since synchronizing signal of video signals is maintained as it is, recording in the dubbing VCR 6 is carried out by means of an ordinary recording method. FIG. 3 is an illustration showing a method of line permutation. In FIG. 3, a usual picture area of each field has 240 scanning lines. These scanning lines are divided into blocks of 30-line and 60-line. The appearance of these two types of the block is made random, and further randomization is realized by exchanging the scanning lines in each of the blocks at random. Thus, line permutation makes it difficult to find a boundary of adjacent blocks. At that time, the scramble key signal is stored within the vertical blanking period, and descrambling is carried out with the help of this scramble key signal to restore the signals. Although a copy-protection method for audio is not shown in this figure, a scramble method, in which a PN code (pseudo-random code) is added to PCM voice, is used to protect the audio portion of the signal.

In FIG. 2, the scramble key signal $K_S$, which is extracted by an extractor 16 from the first decoder 15, consists of a block code. This coded scramble key signal $K_S$ is converted by the encoder 20 to another block code having another code table. The synchronizing signal adder 17 adds a synchronizing signal of the video signal to the block code, and the resultant output is input to the multiplexing device 18. Signals recorded on the distribution tape 7, which are in a similar scrambled state to signals issued from the multiplexing device 18, are reproduced by the reproducing VCR 8. The signals issued from the multiplexing device 18 and the signals issued from the reproducing VCR 8 are input to the AV controller 9 and subjected to selection. Selected signals are input to the projector 21, which includes the ED/WD scanning converter 10 and the second decoder 19, or the display (not shown) to be put on the screen.

As has been stated above, in the second embodiment, both the two signals of different input routes from each other are descrambled by the common (second) decoder 19, and the concealment against illegal recording is improved in the communication satellite transmission system by the intermediate process that the code processing is changed thereat.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A video theater system comprising:
    reproducing means for reproducing a first scrambled signal recorded on a video tape;
    receiving means for receiving a second scrambled signal transmitted from a communication satellite;
    signal converting means for removing a copy-protection process from said second scrambled signal to thereby convert said second scrambled signal into a third scrambled signal which is of the same form as said first scrambled signal;
    selection means for selecting one of said first scrambled signal and said third scrambled signal;
    descrambling means for descrambling a signal selected by said selection means into a picture signal; and
    display means for displaying a picture based on said picture signal.

2. A video theater system in accordance with claim 1, wherein
    said first scrambled signal is scrambled by a line permutation process; and
    said second scrambled signal is scrambled by said line permutation process and is processed by at least one of a synchronization-suppression-and-synchronization-level-shift process and a video inversion process.

3. A reproducing apparatus for a video theater comprising:
    a reproducing video cassette recorder for reproducing a signal recorded on a video tape in a form scrambled by a process of line permutation;
    receiving means for receiving a signal transmitted from a communication satellite in a form copy-protected by at least two processes, one of said at least two processes being a line permutation process;
    a first decoder for removing a copy-protection process other than a line permutation process from a signal received by said receiving means;
    multiplexing means for extracting a scramble key signal from an output signal of said first decoder and for multiplexing a picture signal of said output signal with a signal made by adding a synchronization signal to said scramble key signal within a vertical blanking period;
    selection means for selecting one of signals issued from said reproducing video cassette recorder and said multiplexing means;
    a second decoder for removing a line permutation scrambling process from a signal selected by said selection means; and
    display means for displaying a picture based on an output signal of said second decoder.

4. A reproducing apparatus for a video theater comprising:
    a reproducing video cassette recorder for reproducing a signal recorded on a video tape in a form scrambled by a process of line permutation;
    receiving means for receiving a signal transmitted from a communication satellite in a form copy-protected by at least two processes, one of said at least two processing being a line permutation process;

a first decoder for removing a copy-protection process other than a line permutation process from a signal received by said receiving means;

encoding means for extracting a scramble key signal from an output signal issued from said first decoder and for applying a predetermined encoding to said scramble key signal;

a synchronizing signal adder for adding a synchronizing signal to an output signal of said encoding means;

a multiplexing device for multiplexing a picture signal of an output signal of the first decoder by an output signal of said synchronizing signal adder;

selection means for selecting one of signals issued from said reproducing video cassette recorder and said multiplexing device;

a second decoder for removing a line permutation scrambling process from a signal selected by said selection means; and display means for displaying a picture based on an output signal of said second decoder.

5. A reproducing apparatus for a video theater in accordance with claim 3, wherein said multiplexing means multiplexes said added signal in a vertical blanking period of said picture signal.

6. A reproducing apparatus for a video theater in accordance with claim 4, wherein said multiplexing means multiplexes said added signal in a vertical blanking period of said picture signal.

7. A reproducing apparatus for a video theater in accordance with any one of claims 3–6, wherein said second decoder is incorporated in a casing of said display means.

* * * * *